United States Patent [19]

Hikawa et al.

[11] Patent Number: 5,056,402

[45] Date of Patent: Oct. 15, 1991

[54] MIDI SIGNAL PROCESSOR

[75] Inventors: Kazuo Hikawa; Tsuneo Kosugi, both of Tokyo, Japan

[73] Assignee: Victor Company of Japan, Ltd., Yokohama, Japan

[21] Appl. No.: 476,236

[22] Filed: Feb. 7, 1990

[30] Foreign Application Priority Data

Feb. 8, 1989 [JP] Japan .................................. 1-29307

[51] Int. Cl.[5] .......................... G10H 7/00; G11B 5/00

[52] U.S. Cl. ........................................ 84/645; 360/32; 360/48; 84/601

[58] Field of Search .................... 84/645, 601; 360/32, 360/48

[56] References Cited

U.S. PATENT DOCUMENTS

| | | | |
|---|---|---|---|
| 4,099,437 | 7/1978 | Stavrou et al. . | |
| 4,508,001 | 4/1985 | Suzuki . | |
| 4,682,317 | 7/1987 | Tomisawa . | |
| 4,777,857 | 10/1988 | Stewart . | |
| 4,899,632 | 2/1990 | Okamura | 84/601 |
| 4,922,797 | 5/1990 | Chapman | 84/650 |
| 4,924,745 | 5/1990 | Kimpara et al. | 84/609 |
| 4,942,551 | 7/1990 | Klappert et al. . | |
| 4,945,804 | 8/1990 | Farrand | 84/462 |
| 4,953,039 | 8/1990 | Ploch . | |

FOREIGN PATENT DOCUMENTS

| | | |
|---|---|---|
| 62-146470 | 6/1987 | Japan . |

*Primary Examiner*—William M. Shoop, Jr.
*Assistant Examiner*—Helen Kim
*Attorney, Agent, or Firm*—Lowe, Price, LeBlanc & Becker

[57] ABSTRACT

In a MIDI Signal processor, MIDI data is reproduced from a recording medium. The reproduced MIDI data is outputted. An interruption of the reproducing of the MIDI data is detected. A MIDI status byte is detected after the interruption ends. The outputting of the reproduced MIDI data is suspended when the interruption is detected. The suspending is continued until the MIDI status byte is detected.

3 Claims, 6 Drawing Sheets

FIG. 4

| PACK | MIDI BYTE | DATA | CONTENTS |
|---|---|---|---|
| PACK n | B1 | 90H | :NOTE ON STATUS(CHANNEL 1) |
| | B2 | 3CH → 60 IN DECIMAL | :CENTRAL C NOTE |
| | B3 | 40H → 64 IN DECIMAL | :KEY VELOCITY(INTERMEDIATE LEVEL) |
| | B4 | 40H } RUNNING STATUS | :E NOTE |
| | B5 | 40H } RUNNING STATUS | :KEY VELOCITY |
| | B6 | 43H } RUNNING STATUS | :G NOTE |
| | B7 | 40H } RUNNING STATUS | :KEY VELOCITY |
| | B8～B12 | ALL "0" | |
| PACK n+$m_1$ | B1 | 91H | :NOTE ON STATUS(CHANNEL 2) |
| | B2 | 47H | :B NOTE |
| | B3 | 40H | :KEY VELOCITY |
| | B4 | 43H } RUNNING STATUS | :G NOTE |
| | B5 | 40H } RUNNING STATUS | :KEY VELOCITY |
| | B6～B12 | ALL "0" | |
| PACK n+$m_2$ | B1 | 4AH } RUNNING STATUS | :D NOTE |
| | B2 | 40H } RUNNING STATUS | :KEY VELOCITY |
| | B3 | 43H } RUNNING STATUS | :G NOTE |
| | B4 | 00H } RUNNING STATUS | :KEY VELOCITY |
| | B5～B12 | ALL "0" | |
| PACK n+$m_3$ | B1 | 81H | :NOTE OFF STATUS(CHANNEL 2) |
| | B2 | 47H | :B NOTE |
| | B3 | 00H | |
| | B4 | 4AH } RUNNING STATUS | :D NOTE |
| | B5 | 00H } RUNNING STATUS | |
| | B6～B12 | ALL "0" | |

| FRAME ADRS | TOTAL BYTE NO. | BYTE NO. IN ADRS=18 OF FORMAT(I) | BYTE NO. IN ADRS=15 OF FORMAT(II) |
|---|---|---|---|
| 4n | 94 | 4 | 4 |
| 4n+1 | 94 | 4 | 4 |
| 4n+2 | 94 | 4 | 4 |
| 4n+3 | 93 | 3 | 3 |

MIDI SIGNAL PROCESSOR

BACKGROUND OF THE INVENTION

1. Field of the Invention

This invention relates to an apparatus for processing a digital signal such as a digital signal in MIDI (Musical Instrument Digital Interface) format designed to control electronic musical instruments.

2. Description of the Prior Art

Conventional MIDI format for a digital signal is designed to control electronic musical instruments. In a known MIDI-based music control system, MIDI signals are transmitted between various electronic musical instruments and a keyboard so that the musical instruments can be driven and controlled by operating the single keyboard.

Japanese published unexamined patent application 62-146470 discloses a digital information recording and reproducing system. In the system of Japanese patent application 62-146470, 8-bit MIDI code words representative of control information such as an interval, a scale, and a length of sound is recorded on a magnetic tape by a tape recorder of the helical scan type. When the MIDI words are reproduced from the magnetic tape, a start bit and a stop bit are added to each of the reproduced MIDI words to compose a 10-bit MIDI signal designed to drive and control electronic musical instruments.

A compact disk (CD) is an excellent recording medium for storing a large quantity of digitized information. Since CD signal format and MIDI signal format are significantly different from each other, it is generally difficult to directly record MIDI words on a compact disk. For example, a MIDI word has 8 bits while a usable part of a CD subcode has 6 bits. In addition, the bit rate of the MIDI system is 31,250 bps (bit per second) while the bit rate of the CD subcode is 28,800.

A conventional MIDI system lacks the ability to cope with a sudden interruption of the transmission of a MIDI signal. Therefore, in such a case, some of electronic musical instruments of the MIDI system tend to continue the generation of sounds.

SUMMARY OF THE INVENTION

It is an object of this invention to provide an excellent MIDI signal processor.

According to a first aspect of this invention, a MIDI signal processor comprises means for reproducing MIDI data from a recording medium; means for outputting the reproduced MIDI data; means for detecting an interruption of the reproducing of the MIDI data; means for detecting a MIDI status byte after the interruption ends; means for suspending the outputting of the reproduced MIDI data when the interruption is detected; and means for continuing the suspending until the MIDI status byte is detected.

According to a second aspect of this invention, a MIDI signal processor comprises means for reproducing MIDI data from a recording medium; means for outputting the reproduced MIDI data; means for detecting an uncorrectable error in the reproduced MIDI data; means for detecting a MIDI status byte after the uncorrectable error is detected; means for suspending the outputting of the reproduced MIDI data when the uncorrectable error is detected; and means for continuing the suspending until the MIDI status byte is detected.

According to a third aspect of this invention, a MIDI signal processor comprises means for reproducing MIDI data from a recording medium; means for outputting the reproduced MIDI data; means for detecting a dropout of the reproduced MIDI data; means for detecting a MIDI status byte after the dropout is detected; means for suspending the outputting of the reproduced MIDI data when the dropout is detected; and means for continuing the suspending until the MIDI status byte is detected.

BRIEF DESCRIPTION OF THE DRAWINGS

FIG. 4 is a diagram of an example of the contents of a MIDI data arrangement.

DESCRIPTION OF THE FIRST PREFERRED EMBODIMENT

Figure 1:
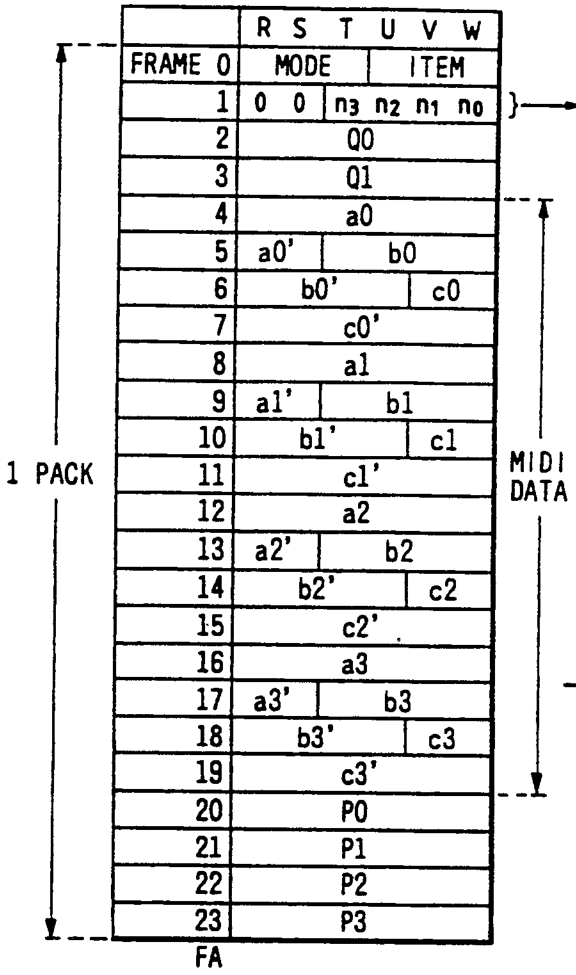
FIG. 1 is a diagram showing the format of a subcode data pack for a compact disk.

The format of recording of subcode data into a compact disk (CD) will be explained hereinafter. FIG. 1 shows stored conditions of subcode data, the quantity of which corresponds to one pack of the CD subcode channel, that is, a set of the 0-th frame to the 23-rd frame. Each frame has 6 usable bits R, S, T, U, V, and W representing data. MIDI data are stored into the 4-th frame to 19-th frame. A unit of MIDI data is a byte, that is, 8 bits. The first MIDI data byte is divided into two parts a0 and a0' contained in the bits R-W of the 4-th frame and the bits R and S of the 5-th frame respectively. The second MIDI data byte is divided into two parts b0 and b0' contained in the bits T-W of the 5-th frame and the bits R-U of the 6-th frame respectively. In such a manner, successive 12 MIDI data bytes are each divided into two parts and are sequentially stored into the 4-th frame to 19-th frame.

Figure 2:
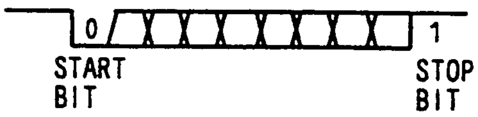
FIG. 2 is a diagram of the waveform of a one-byte MIDI signal which is being transmitted.

FIG. 2 shows a waveform of one unit of a MIDI signal during transmission. One unit of the MIDI signal has a start bit "0", 8-bit MIDI data following the start bit, and a stop bit "1" following the MIDI data.

Figure 3:
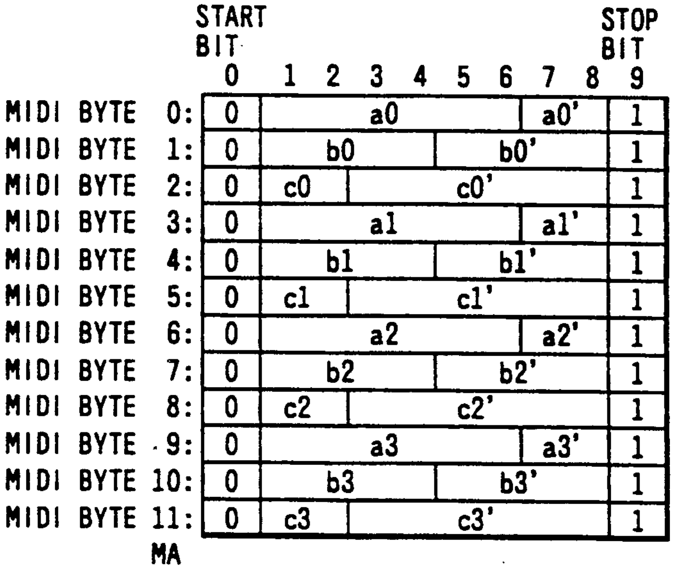
FIG. 3 is a diagram of the arrangement of MIDI data where the MIDI data are separated into a set of one-byte blocks each additionally provided with a start bit and a stop bit.

FIG. 3 shows the structure of one pack of a MIDI signal during transmission. The divided two parts a0 and a0' of the first MIDI data byte are combined again to restore the complete form of the first MIDI data byte. The start bit "0" and the stop bit "1" are added to the head and the end of the first MIDI data byte respectively. The divided two parts b0 and b0' of the second MIDI data byte are combined again to restore the complete form of the second MIDI data byte. The start bit "0" and the stop bit "1" are added to the head and the end of the second MIDI data byte respectively. In such a manner, 12 MIDI data bytes are restored in form and the start bit "0" and the stop bit "1" are added to each MIDI data byte.

According to MIDI standard, MIDI data are transmitted at a bit rate of 3,125 bytes per second. A general CD player (reproducing apparatus) outputs 300 packs per second in compliance with CD signal transmission format. Therefore, the CD player has the ability to output 3,600 bytes of MIDI data per second. In order to meet the requirement for the bit rate of 3,125 bytes per second, only 3,125 bytes of MIDI data are previously stored into 300 packs of the CD subcode channel.

For example, 300 packs are separated into 25 groups each having 12 packs. In each group, 5 packs have 11 bytes of MIDI data each and 7 packs have 10 bytes of MIDI data each. Therefore, each group has 125 bytes of MIDI data, and 300 packs have 3,125 bytes of MIDI data.

In another example, 300 packs are separated into 25 groups each having 12 packs. In each group, some packs have 12 bytes of MIDI data each and the remaining packs have 11 or less bytes of MIDI data each while the sum of the numbers of bytes of the MIDI data are limited to 125. Therefore, each group has 125 bytes of MIDI data, and 300 packs have 3,125 bytes of MIDI data. This example is made in consideration of the following fact. Most of MIDI data are 3-byte note on commands or 3-byte note off commands. Handling MIDI data in a block of 12 bytes is advantageous since 12 bytes are a multiple of 3 bytes related to such commands. In this way, the number of MIDI bytes being transmitted for each pack can be chosen arbitrarily in a range equal to or less than 12. The number of bytes is indicated in the second frame in each pack (see FIG. 1). In addition, in the case where the MIDI data has 11 bytes or less, the whole of the unused region of the 12-th byte is occupied by "0".

MIDI standard defines a running status for shortening a time of data transmission and thereby decreasing or preventing a delay of the transmission of data with respect to the related actual performance. Specifically, the running status is the omission of a status of a current message if the status of the current message is the same as that of the immediately preceding message.

FIG. 4 shows an example of subcode data where the running status is used in CD packs to reduce the information quantity. While the terms "tone" and "volume" are used in the following description of this example for an easy understanding, the terms "note" and "key velocity" are generally used therefor in the field of MIDI. In the example of FIG. 4, a central C tone (note), an E tone, and a G tone of a channel 1 are made on, and then a B tone and a G tone of a channel 2 are made on. Thereafter, a D tone of the channel 2 is made on and the G tone of the channel 2 is made off. Then, the B tone and the D tone of the channel 2 are made off. In FIG. 4, the characters B1-B12 denote MIDI bytes within packs.

A prior-art MIDI signal processing system will be explained hereinafter for a better understanding of this invention. It is now assumed that, during the reproduction of the MIDI data of FIG. 4 from a compact disk, a dropout occurs in the reproduced signal due to a defect of the compact disk when the pack n+m1 is being reproduced, and that the data of the pack n+m1 is lost by the dropout in later signal processing. In such a case, a prior-art system operates as follows. When the subsequent pack n+m2 is reproduced normally, all the data of the pack n+m2 is regarded as data of a running status in a MIDI signal receiver side since there is no status byte in the pack n+m2. Since the status byte which is finally reproduced before the pack n+m1 is 90H in the pack n, the D tone of the channel 1 is made on and the G tone of the channel 1 is made off. It is correct that the D tone of the channel 2 is made on and the G tone of the channel 2 is made off. Accordingly, the performances of both the channels 1 and 2 are wrong. Since the note off command for the D tone of the channel 1 is absent from the data on the compact disk, the D tone of the channel 1 will remain on.

This invention resolves the previously-mentioned drawback of the prior-art system by using at least one of the following two ways.

(1) In the case where an operation such as "stop" or "pause" of interrupting reproduction is performed, or in the case where an uncorrectable error or a dropout occurs during the reproduction of data from a compact disk, the outputting of the reproduced data to a MIDI terminal is continuously suspended until a status byte is detected.

(2) A running status is arranged so as to be completed within a single pack, and a MIDI command is arranged so as not to extend over two packs. This arrangement is made in consideration of the fact that the error correction of CD subcodes is performed in unit of pack, and a failure in the error correction occurs in unit of pack. The recording of data into a compact disk is designed so that the first MIDI data of each pack can be always a status byte.

Figure 5:
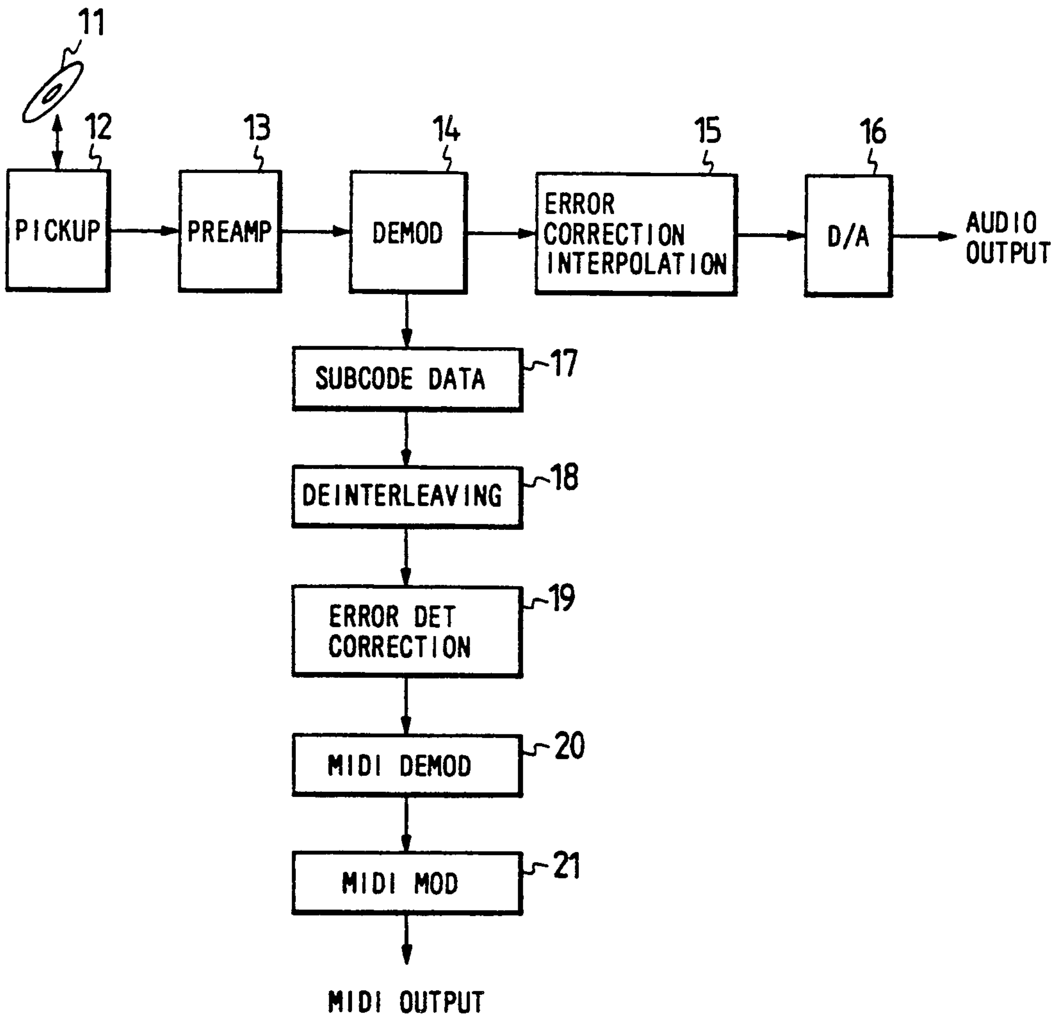
FIG. 5 is a block diagram of a MIDI signal processer according to a first embodiment of this invention.

FIG. 5 shows a MIDI signal processor according to a first embodiment of this invention. With reference to FIG. 5, CD data is read out from a CD 11 by an optical pickup 12. The readout data is fed from the optical pickup 12 to a PLL EFM demodulator 14 via a photodetector preamplifier 13. The PLL EFM demodulator 14 processes the input data through EFM demodulation and derives audio data and subcode data from the input data.

The audio data is outputted from the PLL EFM demodulator 14 to an audio data error correction and interpolation circuit 15. The audio data error correction and interpolation circuit 15 performs error correction and interpolation of the input audio data. An output audio data from the audio data error correction and interpolation circuit 15 is converted into a corresponding analog audio signal by a D/A converter 16. The analog audio signal is outputted from the D/A converter 16.

The subcode data is fed from the PLL EFM demodulator 14 to a de-interleaving circuit 18 via a subcode data extracting circuit 17. The de-interleaving circuit 18 performs a de-interleaving process on the input subcode data. An error detection and correction circuit 19 performs error detection and correction of the output data from the de-interleaving circuit 18. A MIDI data demodulator 20 demodulates MIDI data from the output data of the error detection and correction circuit 19. The MIDI data demodulator 20 outputs a MIDI signal representative of the demodulated MIDI data. The output MIDI signal from the MIDI data demodulator 20 is modulated by a MIDI signal modulator 21. The modulated MIDI signal is outputted from the MIDI signal modulator 21.

The subcode data extracting circuit 17, the de-interleaving circuit 18, and the error detection and correction circuit 19 may be the same as those in a conventional decoder of CD graphics. The error detection and correction of the subcode data are performed by use of a group of parity bits P0-P3 in the 20-th frame to the 23-rd frame (see FIG. 1) and a group of parity bits Q0 and Q1 in the second frame and the third frame (see FIG. 1). Generally, the error detection and correction circuit 19 is composed of a microcomputer including a CPU, a ROM, and a RAM. The microcomputer is programmed so as to execute the error detection and correction in a known way. The error detection and correction circuit 19 may be formed by discrete components.

Since the MIDI signal processor of FIG. 5 has many components usable in a CD graphics decoder, the MIDI signal processor of FIG. 5 can be designed as a two-way system capable of processing both of a MIDI signal and a CD graphics signal. In the case of such a two-way system, it is necessary to discriminate whether the data in the first frame, and the fourth frame to the 19-th frame of FIG. 1 relate to graphics or MIDI. Three bits of the 0-th frame (see FIG. 1) which represent a mode are used for this purpose. Specifically, these bits are "001" in the case of graphics and are "011" in the case of MIDI. The latter three bits of the 0-th frame relate to an item denoting the type of graphics or other information. Specifically, the latter three bits are "000" in the case where MIDI data is contained in the pack.

The MIDI data demodulator 20 converts the one-pack quantity of subcodes into 12 bytes of MIDI data. During this conversion, the MIDI data demodulator 20 detects the number of bytes which is represented by the bits n3 to n1 of the second frame (see FIG. 1).

Figure 6:
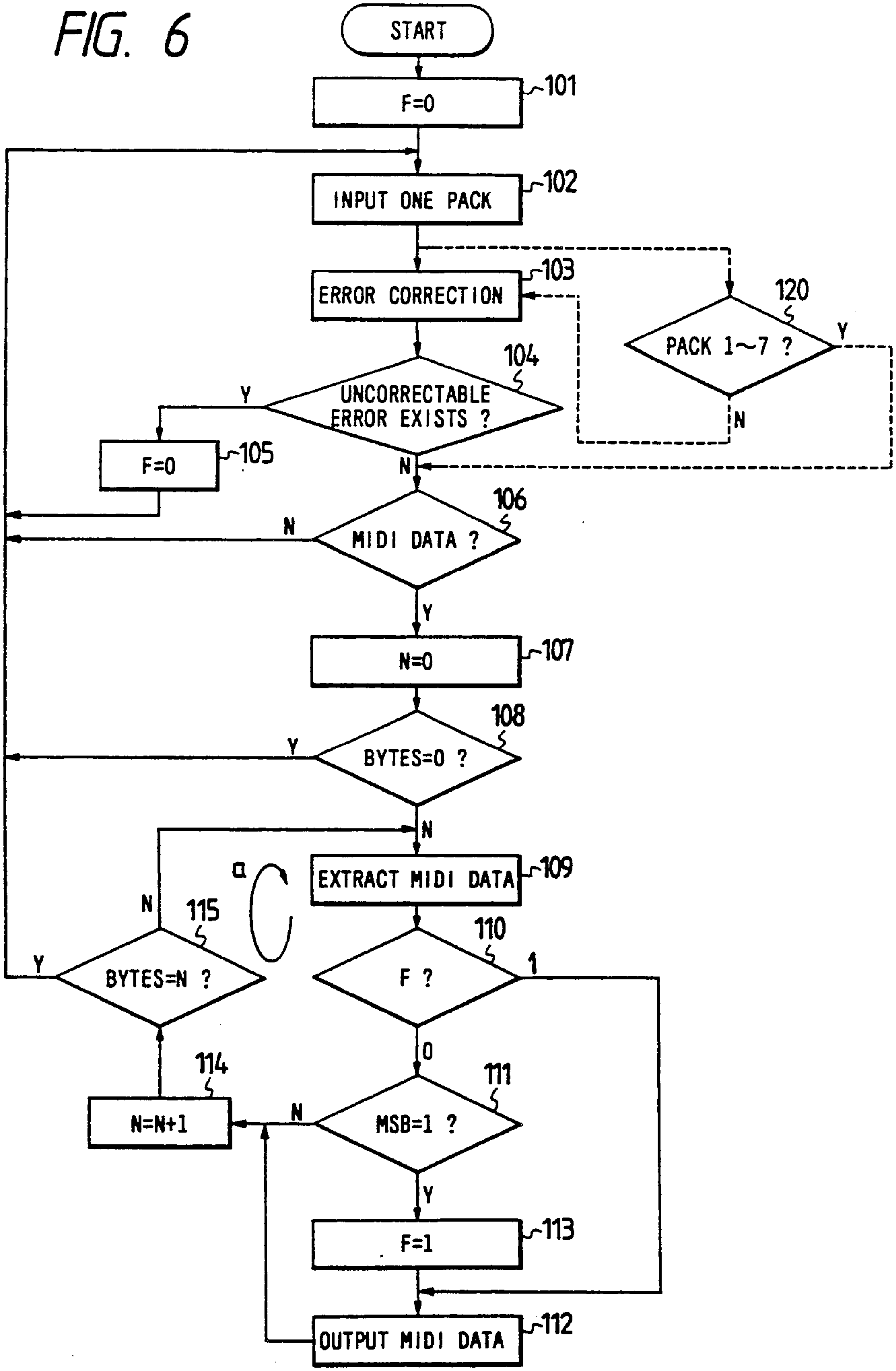
FIG. 6 is a flowchart of a part of a program operating a microcomputer in the MIDI signal processor of FIG. 5.

The subcode data extracting circuit 17, the de-interleaving circuit 18, the error detection and correction circuit 19, and the MIDI data demodulator 20 are composed of a general microcomputer which operates in accordance with a program stored in an internal ROM. FIG. 6 is a flowchart of a part of this program which relates to the operation of the error detection and correction circuit 19 and the MIDI data demodulator 20.

The program of FIG. 6 starts when the MIDI signal processor starts to play the disk 11 in a normal play mode after an operation of a non-play mode such as stop, pause, skip, search or eject mode. A first block 101 sets a flag F to "0", and a block 102 inputs one pack data. A block 103 executes error detection and correction. A block 104 determines whether an uncorrectable error or dropout exists in the currently-inputted pack data. When any uncorrectable error does not exist, the program advances to a block 106. When an uncorrectable error exists, the program advances to a block 105, where the flag F is set to "0", then returns to the block 102 to input a subsequent pack data. The flag F being "0" indicates that a normal play mode has been started or an uncorrectable error or dropout has occurred and a status byte of MIDI data has not been detected yet since the starting of the normal play mode or the occurrence of the uncorrectable error or dropout. The block 106 determines whether or not the current pack contains MIDI data. When the current pack does not contain MIDI data, the program returns to the block 102 executing the inputting of a subsequent pack. When the current pack contains MIDI data, the program advances to a block 107 setting the variable N to "0". The variable N denotes the count number for the MIDI bytes. A block 108 following the block 107 determines whether the variable BYTES representing the number of MIDI bytes in the packs and being in the first frame (see FIG. 1) is "0". When the number of MIDI bytes is zero, the program returns to the block 102. When the number of MIDI bytes is one or more, the program advances to a block 109 extracting MIDI data byte by byte. In the case of a CD, the block 109 executes the conversion from the 6-bit form to the 8-bit form with respect to the MIDI data. A block 110 following the block 109 determines whether the flag F is "0" or "1". When the flag F is "0", the program advances to a block 111. When the flag F is "1", the program advances to a block 112. The block 111 determines whether or not the MSB (most significant bit) of the extracted MIDI byte is "1", that is, whether or not the extracted MIDI byte is a status byte. When a status byte is detected, the program advances to the block 112 via a block 113 setting the flag to "1". When a status byte is not detected, the program advances to a block 114 incrementing the count number N by "1". The block 112 stores the MIDI data into an internal output buffer memory. After the block 112, the program advances to the block 114. A block 115 following the block 114 determines whether or not the MIDI byte count number N has reached the MIDI byte number BYTES. When the MIDI byte number BYTES equals the MIDI byte count number N, the program returns to the block 102. When the MIDI byte number BYTES differs from the MIDI byte count number N, the program returns to the block 109.

As understood from FIG. 6 and the related description, during a period which follows the generation of an error or the execution of a "stop operation", the execution of the program continues to circulate through a loop denoted by "a" of FIG. 6 and the MIDI data keeps prevented from being stored into the internal output buffer memory until a status byte is detected. In this case, when a status byte is detected at the block 111, the MIDI data is stored into the internal buffer memory by the block 112.

In the case of DAT (Digital Audio Tape Recorder), since the error detection and correction are performed on the first pack to the seventh pack of two blocks having successive even and odd addresses, a block 120 for the judgment about the first pack to the seventh pack is added as shown in FIG. 6.

According to the program of FIG. 6, the data of the 4-th frame to the 19-th frame of FIG. 1 is converted in form so that 12 bytes of MIDI data of FIG. 3 are generated for one pack. Similar processing is performed for a next pack.

The 12 bytes of MIDI data are fed to the internal buffer memory of the MIDI signal modulator 21 and are subjected to parallel/serial conversion synchronous with a MIDI transmission clock signal. As shown in FIG. 2, a start bit and a stop bit are added to a MIDI byte to form a 10-bit serial MIDI signal which is outputted to an exterior. The outputting of the MIDI signal to the exterior is performed in synchronism with the MIDI transmission clock signal.

Figures 7, 9:
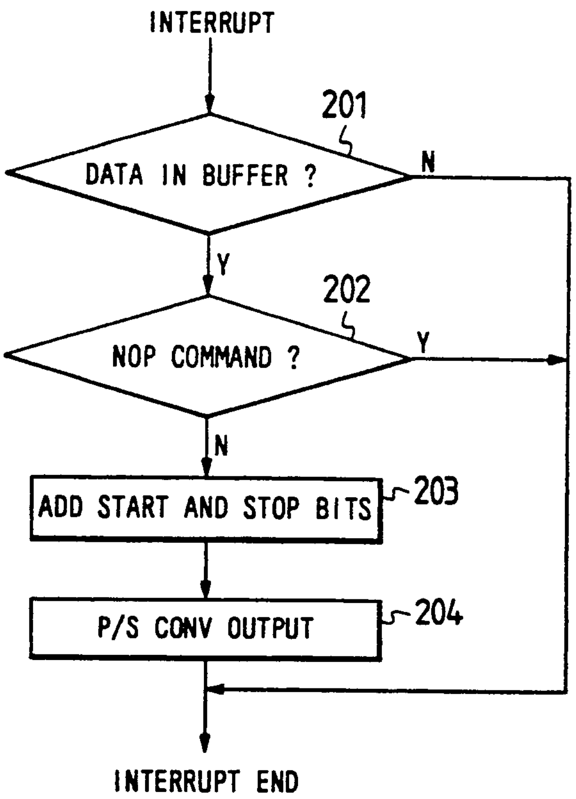
FIG. 7 is a flowchart of another part of the program which is executed by an interruption process.
FIG. 9 is a diagram showing the details of a part of the format applied to the recording of MIDI data into the DAT recording medium.

FIG. 7 is a flowchart of a part of the program which is repeatedly executed by an interruption process at a predetermined period. A first block 201 of the program of FIG. 7 checks whether or not data is present in the internal buffer memory. When the data is absent from the internal buffer memory, the interruption program part ends and the program returns to the main routine of FIG. 6. When the data is present in the internal buffer memory, the program advances to a block 202. The block 202 determines whether or not a NOP command is used in the current pack. The NOP command orders the deactivation to an empty byte of MIDI data during the reproduction of the MIDI signal. When a NOP command is used in the current byte data, the interruption program part ends and the program returns to the main routine of FIG. 6. When a NOP command is not used in the current byte data, the program advances to a block 203 adding a start bit and a stop bit to the MIDI data byte. A block 204 following the block 203 executes the parallel-to-serial conversion of the MIDI data signal and the outputting of 1 byte of the serial MIDI signal. After the block 204, the interruption program part ends and the program returns to the main routine of FIG. 6.

As understood from FIG. 7 and the related description, when a NOP command is detected, the outputting of the serial MIDI signal is interrupted. In the case where a NOP command is used in the first byte of a CD pack and MIDI data are disposed in the second byte and later bytes, a status byte is placed into the second byte via a MIDI terminal. In this case, since the NOP command is un-outputted data, the first MIDI data except the NOP command is set as a status byte.

DESCRIPTION OF THE SECOND PREFERRED EMBODIMENT

Figure 8:
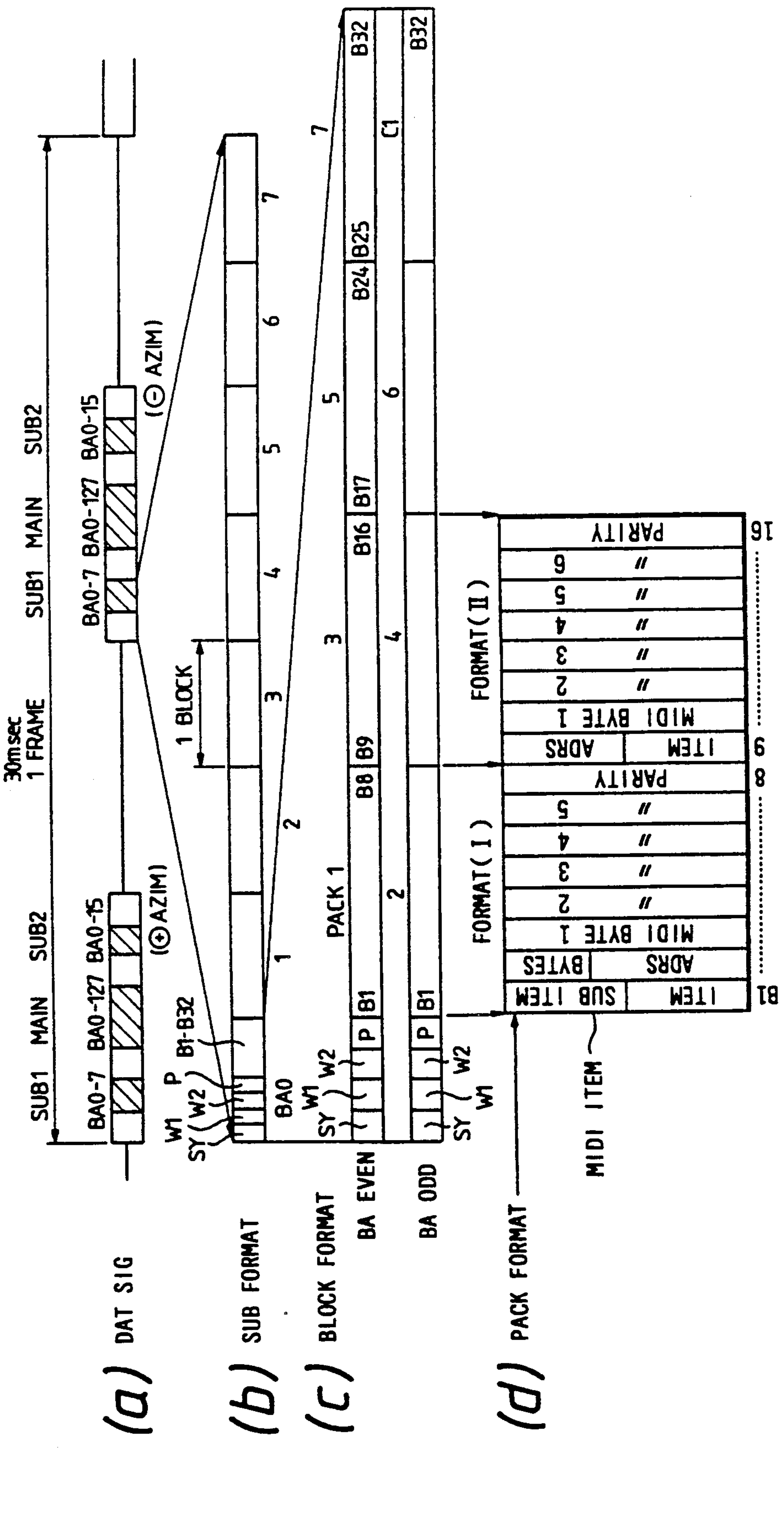
FIG. 8 is a diagram showing the format applied to the recording of MIDI data into a DAT (Digital Audio Tape Recorder) recording medium in a second embodiment of this invention.

FIG. 8 relates to a second embodiment of this invention which is applied to the recording and reproduction of MIDI data into and from a DAT recording medium. The part (a) of FIG. 8 shows a well-known DAT frame format. The part (b) of FIG. 8 shows a subcode region of one track in the DAT frame format. The part (c) of FIG. 8 shows a format of one block in the DATA subcode region. In the part (c) of FIG. 8, the character BA Even denotes a format of even addresses and the character BA Odd denotes a format of odd addresses. The parts (a), (b), and (c) of FIG. 8 show known matters. In the part (d) of FIG. 8, the sections Format (I) and Format (II) show conditions where MIDI data are recorded into a DAT pack format. In the part (d) of FIG. 8, the segment ITEM and the segment PARITY are known.

According to the current DAT format issued by DAT Conference, July in 1987, ITEM values "1000" to "1110" are undefined. One of these undefined values, for example, "1000", is used for MIDI mode. A detailed description will be made on the section Format (I) hereinafter. In the section Format (I), "SUB ITEM" identifies the contents of the segments B2–B7. For example, in the case where MIDI data are placed in the segments B2–B7, "SUB ITEM" is set to "0000". In the section Format (I), "ADRS" denotes an address selected from one of 19 different addresses "00000" to "10010". The address ADRS represents the position of MIDI data relative to one frame.

One DAT pack can contain 5 bytes of MIDI data, and one DAT frame can contain 95 bytes of MIDI data. Since one DAT frame corresponds to 30 msec, 3.16K bytes of MIDI data can be recorded or reproduced during one second. This rate exceeds the prescribed maximum transmission rate of MIDI data. Accordingly, it is necessary to limit the quantity of recorded MIDI data.

As shown in FIG. 9, four DAT frames are designed so as to contain 375 bytes of MIDI data to realize the limitation of the recorded MIDI data quantity. In this case, the rate of the recording or reproduction of MIDI data equals 3.125K byte per second which agrees with the prescribed transmission rate of MIDI data.

Specifically, four successive DAT frames are handled as a unit. Each of the first, the second, and the third frame in a unit which have respective addresses "4n" to "4n+2" contains 94 bytes of MIDI data while the fourth frame in a unit which has an address "4n+3" contains 93 bytes of MIDI data.

Five bytes of MIDI data are placed in the segments of each frame which are denoted by the addresses "0" to "17". Four bytes of MIDI data are placed in the segment of a frame which is denoted by the address "18" in the case where the frame has an address equal to one of "4n" to "4n+2". Three bytes of MIDI data are placed in the segment of a frame which is denoted by the address "18" in the case where the frame has an address equal to "4n+3".

A detailed description will be made on the section Format (II) hereinafter. In the part (d) of FIG. 4, the section Format (II) shows conditions where 6 bytes of MIDI data are placed in one DAT pack to reduce the number of packs necessary for the MIDI data. In the Format (II), the character ADRS denotes an address similar to the address of the section Format (I). Sixteen different addresses "0" to "15" ("0000" to "1111") are allotted to the address ADRS. In order to meet the prescribed transmission rate of MIDI data, the section Format (II) is designed similarly to the section Format (I) as will be described hereinafter. Each of the first, the second, and the third frame in a unit which have respective addresses "4n" to "4n+2" contains 94 bytes of MIDI data while the fourth frame in a unit which has an address "4n+3" contains 93 bytes of MIDI data. Four bytes of MIDI data are placed in the segment of a frame which is denoted by the address "15" in the case where the frame has an address equal to one of "4n" to "4n+2". Three bytes of MIDI data are placed in the segment of a frame which is denoted by the address "15" in the case where the frame has an address equal to "4n+3".

As shown in the part (c) of FIG. 8, in the case of DAT, the error correction of subcodes is performed within packs 1, 3, 5, 7, 2, 4, 6, and C1 present in two successive blocks where the pack C1 contains error detection and correction data. Accordingly, DAT packs 1 to C1 correspond to CD packs. Therefore, data and a running status are designed so as to be completed within packs 1 to C1. In addition, the firstly-outputted MIDI data of each block composed of packs 1 to C1 is designed as a status byte.

What is claimed is:

1. A MIDI signal processor comprising:

means for reproducing MIDI data from a recording medium;

means for outputting the reproduced MIDI data;

means for detecting an interruption of the reproducing of the MIDI data;

means for detecting a MIDI status byte after the interruption ends;

means for suspending the outputting of the reproduced MIDI data when the interruption is detected; and means for continuing the suspending until the MIDI status byte is detected.

2. A MIDI signal processor comprising:

means for reproducing MIDI data from a recording medium;

means for outputting the reproduced MIDI data;

means for detecting an uncorrectable error in the reproduced MIDI data;

means for detecting a MIDI status byte after the uncorrectable error is detected;

means for suspending the outputting of the reproduced MIDI data when the uncorrectable error is detected; and means for continuing the suspending until the MIDI status byte is detected.

3. A MIDI signal processor comprising:

means for reproducing MIDI data from a recording medium;

means for outputting the reproduced MIDI data;

means for detecting a dropout of the reproduced MIDI data;

means for detecting a MIDI status byte after the dropout is detected;

means for suspending the outputting of the reproduced MIDI data when the dropout is detected: and means for continuing the suspending until the MIDI status byte is detected.

* * * * *